United States Patent [19]

Sakagami

[11] Patent Number: 4,603,480
[45] Date of Patent: Aug. 5, 1986

[54] LINEAR SCALE TYPE DISPLACEMENT MEASURING INSTRUMENT

[75] Inventor: Seiji Sakagami, Kawasaki, Japan

[73] Assignee: Mitutoyo Mfg. Co., Ltd., Tokyo, Japan

[21] Appl. No.: 733,760

[22] Filed: May 14, 1985

[30] Foreign Application Priority Data

May 22, 1984 [JP] Japan .................. 59-103467

[51] Int. Cl.⁴ .................................. G01B 11/04
[52] U.S. Cl. .................. 33/125 R; 33/125 A; 33/125 T
[58] Field of Search ............ 33/125 R, 125 A, 125 C, 33/125 T

[56] References Cited

U.S. PATENT DOCUMENTS

| | | | |
|---|---|---|---|
| 4,160,328 | 7/1979 | Ernst | 33/125 R |
| 4,492,032 | 1/1985 | Nelle | 33/125 C |
| 4,512,082 | 4/1985 | Burkhardt | 33/125 R |

FOREIGN PATENT DOCUMENTS

| | | | |
|---|---|---|---|
| 1541285 | 2/1979 | United Kingdom | 33/125 R |
| 2117908 | 10/1983 | United Kingdom | 33/125 R |
| 2124381 | 2/1984 | United Kingdom | 33/125 C |

Primary Examiner—Willis Little
Attorney, Agent, or Firm—Parkhurst & Oliff

[57] ABSTRACT

In a linear scale type displacement measuring instrument including: a case fixed to one of relatively movable members; a main scale; a carriage; index scales and a detector; the carriage and the other of the relatively movable members are connected to each other through a connecting mechanism, one end of which is connected to the carriage, the other end of which is connected to the other of the relatively movable members in a location where a section standard length of the main scale is maintained as it is when the main scale is straight, i.e. within the neutral planes of the case as a whole including the main scale mounted, and capable of permitting the carriage to change the posture thereof such that the index scales can be held in a state of perpendicularly intersecting the normal line of the surface of a warp of the main scale.

12 Claims, 13 Drawing Figures

LINEAR SCALE TYPE DISPLACEMENT MEASURING INSTRUMENT

BACKGROUND OF THE INVENTION

1. Field of the Invention

This invention relates to linear scale type displacement measuring instrument, and more particularly, to improvements in a linear scale type displacement measuring instrument suitable for use in an optical type displacement measuring instrument including a main scale and an index scale, which are formed of a transparent material such as glass.

2. Description of the Prior Art

There has heretofore been known a linear scale type optical displacement measuring instrument including:

a hollow elongate case fixed to one of relatively movable members;

a main scale secured to the inner surface of the case in the longitudinal direction thereof;

a carriage connected to the other of the relatively movable members and movable along the main scale in the longitudinal direction thereof;

index scales held by the carriage as opposed to the main scale; and a detector for converting a displacement value of relative movement between the main scale and the index scales into an electric signal.

Since the overall accuracy of an order of about one micro meter is required in the displacement measuring instrument of the type described, the requirements to respective elements and assembled structure thereof are quite strict. Even if the respective elements are on the same level, there are such special circumstances that a difference between the assembled structures is directly connected to the quality level of the accuracy as it is.

As one of special circumstances peculiar to the displacement measuring instrument of the type described, there is a problem that the displacement measuring instrument reliably assembled under a predetermined construction cannot be mounted in as assembled state to a machine or the like. Namely, when mounted to the machine, the displacement measuring instrument is subjected to an external force, with the result that a warp is caused to the main scale which has been straightenedly adjusted. This warp generates a difference between an actual movement value of the carriage connected to the other of the relatively movable members and a displacement information read out of the main scale having the warp, thus presenting the disadvantage of not securing the detecting accuracy.

In order to reduce an error due to the warp, there has heretofore been taken such a measure that, from a viewpoint of that the warp of the main scale generated during mounting is unavoidable with some degree in difference being admitted, the main scale is assumed to be a simple beam freely held in the air and applied at opposite ends thereof with bending moments. For example, in Japanese Patent Publications Nos. 27803/81, 5441/82, Japanese Patent Laid-Open No. 9007/83 and the like, there are disclosed constructions in which connection of the carriage is made within the neutral plane of the main scale itself or at the center of a graduated surface. Namely, in these examples of the prior art, as for the thicknesswise direction of the main scale for example, the intermediate portion in the thicknesswise direction of the main scale is assumed to be the neutral plane, and, under the prerequisite that an extension occurs on one side of the neutral plane and a shrinkage occurs on the other side, the carriage is connected in a manner to be rotatable relative to the main scale within the neutral plane.

However, all of these examples of the prior art have been unsatisfactory in effects, and, along with the highly improved accuracy in recent years, necessity has been voiced for the improvements in this respect. Namely, the warp of the main scale actually occurring during mounting is observed along with a distortion of the case, to which the main scale is secured. In consequence, the warp of the main scale behaves as commensurate to the curvature of the case, depending on the position of the main scale in the case. Namely, if consideration is given to that the warp of the main scale conforms itself to such a characteristics as in a composite beam formed of materials different from each other, then these examples of the prior art have been quite imperfect.

SUMMARY OF THE INVENTION

The present invention has been developed to obviate the above described disadvantages of the prior art and has as its object the provision of a linear scale type displacement measuring instrument wherein the carriage can be connected to the other of the relatively movable members in the substantial neutral planes of the main scale, so that a displacement can be measured with high accuracy irrespective of a warp of the main scale during mounting.

To achieve the above-described object, the present invention contemplates that, in a linear scale type displacement measuring instrument including: a hollow elongate case fixed to one of relatively movable members; a main scale secured to the inner surface of the case in the longitudinal direction thereof; a carriage connected to the other of the relatively movable members and movable along the main scale in the longitudinal direction thereof; index scales held by the carriage as opposed to the main scale; and a detector for converting a dispacement value of relative movement between the main scale and the index scales into an electric signal; the carriage and the other of the relatively movable members are connected to each other through a connecting mechanism, one end of which is connected to the carriage, the other end of which is connected to the other of the relatively movable members within neutral planes of the case as a whole including the main scale mounted, and capable of permitting the carriage to change the posture thereof such that the index scales can be held in states of perpendicularly intersecting the normal line of the surface of a warp of the main scale.

A specific form of the present invention is of such an arrangement that connections through the aforesaid connecting mechanism is made on a cross line between a plurality of neutral planes crossing each other of the case as a whole including the main scale mounted, so that the present invention can be embodied with a very simplified construction.

Another specific form of the present invention is of such an arrangement that the aforesaid connecting mechanism is formed into a single rod, so that the present invention can be very easily materialized.

A further specific form of the present invention is of such an arrangement that connections by the aforesaid connecting mechanism are made in the respective neutral planes crossing each other of the case as a whole including the main scale mounted, so that, even when a cross line between the neutral planes of the case as a whole including the main scale mounted is present within an article such as the main scale, the present invention can be materialized.

A still further specific form of the present invention is of such an arrangement that the aforesaid connecting mechanism is formed into two sets of flat springs, so that one part of the connecting mechanism can be used as a connecting arm, and not only the structure is relatively simple but also an adverse influence of a method of fixing the main scale to the case is not easily exerted.

A still more further specific form of the present invention is of such an arrangement that the aforesaid connecting mechanism includes two sets of flat springs and a connecting bracket for linking the flat springs to one another, so that changes in position of the carriage can be performed more smoothly and, whereever the neutral planes of the case as a whole including the main scale may be present, the present invention can be materialized easily.

According to the present invention, the carriage and the other of the relatively movable members are connected to each other through the connecting mechanism, one end of which is connected to the carriage, the other end of which is connected to the other of the relatively movable members in a location where a section standard length is maintained as it is when the main scale is straight, i.e. within the neutral planes of the case as a whole including the main scale mounted and mounting means, and capable of permitting the carriage to change the posture thereof such that the index scales can be held in a state of perpendicularly intersecting the normal line of the surface of a warp of the main scale, whereby the carriage and the other of the relatively movable members are connected to each other within the substantial neutral planes of the main scale mounted, so that connections more suitable to the actual warp of the main scale mounted can be made. In consequence, a displacement can be measured with high accuracy irrespective of a warp of the main scale at the time of mounting.

According to the experiments conducted by the inventors of the present invention, it has been ascertained that there is a difference between the actual warp of the main scale and the hypothetical characteristics of the examples of the prior art, which contributes to unsatisfactory effects of the examples of the prior art. More specifically, in the actual warp, both extensions or shrinkages can be generated at opposite sides of the thicknesswise direction of the main scale, and consequently, the predetermined standard length of the main scale when the main scale is straight should not necessarily remain in the widthwise direction of the main scale after the main scale is distorted. So, it cannot be said that the examples of the prior art aiming to make corrections on the ground of the location of the invariable standard length (i.e. the neutral plane), being present in the main scale have the ground of universality.

Detailed description will now be given of the above circumstances with reference to FIG. 1.

Figure 1:
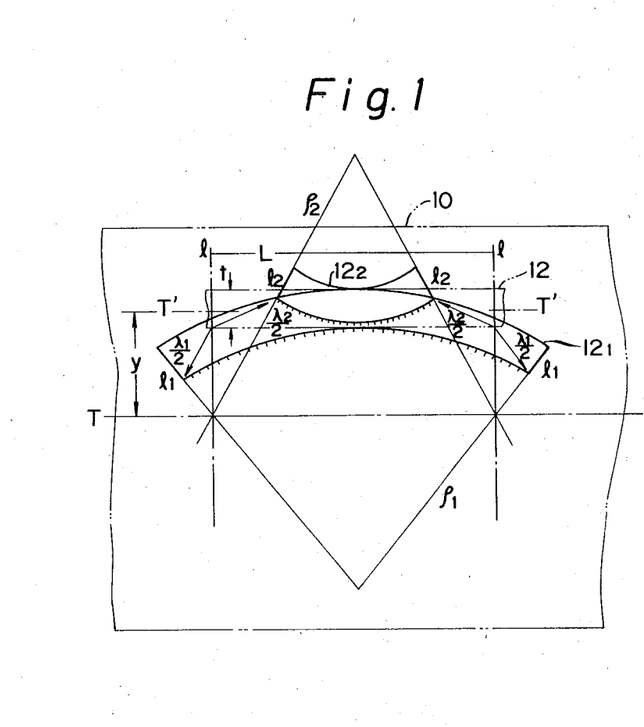
FIG. 1 is a graphic chart in explanation of the principle of the present invention.

For the convenience of explanation, FIG. 1 exaggeratingly indicates a straight main scale 12, which has been mounted to a straight case 10, is curved when the case 10 is mounted to a machine or the like, whereby a total extension $12_1$ or a total shrinkage $12_2$ is generated. Referring to the drawing, designated at T—T is a longitudinal neutral axial line of the case 10, which is determined by the general configuration and the like of the case 10, and T'—T' is the center in the widthwise direction of the main scale 12, which indicates a longitudinal neutral axial line when the main scale itself is taken into consideration.

In consequence, if consideration is given to that the case 10 as a whole including the main scale 12 mounted is a composite beam, then the longitudinal neutral axial line T—T is invariable in length even if the case 10 is curved. However, the main scale 12 is shifted by a high value y from the longitudinal neutral axial line T—T of the case 10, whereby the standard length l—l is extended to $l_1$—$l_1$, when the total extension is $12_1$ or shrunk to $l_2$—$l_2$ when the total shrinkage is $12_2$.

Here, both an extension value $\lambda_1$ and a shrinkage value $\lambda_2$ are represented by the relationship of the following equation.

$$\lambda i = \epsilon i l i = (\gamma i / \rho i) l i \qquad (1)$$

where $\epsilon i$ is a distortion, $li$ a natural length of the main scale 12, and $\rho i$ a radius of curvature of a warp of the main scale 12.

In consequence, each graduation is extended by $(\lambda_1/2 + \lambda_1/2)$ or shrunk by $(\lambda_2/2 + \lambda_2/2)$ in an arrow-marked direction. On the other hand, a standard length L of the main scale 12 when the main scale 12 is straight depends only on the longitudinal neutral axial line T—T as a whole. In consequence, the moving path of a movable portion of the machine, which moves on a straight line, is made to meet the longitudinal neutral axial line T—T, and, if reading of the graduation divisions during the movement is performed such that the divisions within the scope of $(L + \lambda_1)$ or $(L - \lambda_2)$, i.e. the same number of the divisions as in the standard length L when the main scale is straight, then the both values become equal to each other, whereby any error due to a warp of the main scale 12 does not occur.

Additionally, the longitudinal neutral axial line T—T of the case 10 differs in accordance with the mode of mounting of the main scale 12 to the case 10. If the construction is determined, the longitudinal neutral axial line T—T is determined unambiguously, and it is clearly constant whatever the extension or shrinkage may be. Namely, it is conceivable that there occurs a relative displacement in the longitudinal direction, a displacement cannot occur in a direction perpendicularly intersecting the longitudinal direction. Further, even if the direction of the warp of the main scale 12 is varied, the longitudinal neutral axial line T—T thereof is invariable, so that the longitudinal neutral axial line T—T can be utilized without being restricted by the mode of mounting to the case.

The foregoing description is concerned with the widthwise direction of the main scale, however, the same thinking way may be applied to the direction of height of the main scale.

The present invention has been made on the basis of the results of the above-described study.

According to the present invention, the other end of the connecting mechanism moves on a line of a invariable length irrespective of the warp of the case, while the index scales read the divisions corresponding to the standard length of the main case extended or shrunk, which main scale is deformed in accordance with the warp of the case. So that a length of movement at the other end, i.e. the movable side, and a read value meet each other, thus eliminating an error at the time of mounting. Furthermore, the positions of the neutral planes can be selected at desirable positions as viewed from the arrangement of the elements, so that a space necessary for guiding the carriage can be readily secured in the case. Further, no limitation is imposed on the portion where the graduation fringes are provided in the main scale. Furthermore, the configuration and the like of the case is determined such that the neutral planes of the main scale meet the neutral planes of the case as a whole, so that the connecting mechanism can be simplified. Further, the means for mounting the main scale to the case is not restricted, so that any mounting means from a rigid one to a one capable of moving in the longitudinal direction for avoiding damages due to the heat distortion can be desirably selected. Furthermore, whichever direction, convex or concave, the warp of the scale in the case may be, the neutral planes determined by the construction are invariable, so that the labor of the mounting work in consideration of the direction of distortion and/or the degree of distortion becomes unnecessary.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the embodiments of the optical linear scale type displacement measuring instrument, to which the present invention is applied, with reference to the drawings.

As shown in FIGS. 2 to 5, according to the first embodiment of the present invention, in a reflectory type optical linear scale type displacement measuring instrument including: a hollow elongate case 10 fixed to one 8A of relatively movable members; a reflectory main scale 12 secured to the inner surface of the case 10 in the longitudinal direction thereof; a carriage 14 connected to the other 8B of the relatively movable members and movable along the main scale 12 in the longitudinal direction thereof; four index scales 16 held by the carriage 14 as opposed to graduation fringes 12A of the main scale 12; and a detector, not shown, for converting a displacement value of relative movement between the main scale 12 and the index scales 16 into an electric signal; wherein a cross line T—T between two neutral planes perpendicularly intersecting each other of the main scale 12 is present in a space of the case 10, the carriage 14 and the other 8B of the relatively movable members are connected to each other through a single rod 20 with a connecting arm 21, which constitutes a connecting mechanism, one end of which is connected to the carriage 14, the other end of which is connected to the other 8B of the relatively movable members on a cross line T—T between the two neutral planes perpendicularly intersecting each other (Refer to FIG. 5) of the case 10 as a whole including the main scale 12 mounted, and capable of permitting the carriage 14 to change the posture thereof such that the index scales 16 can be held in states of perpendicularly intersecting the normal line of the surface of a warp of the main scale 12.

Figure 2:
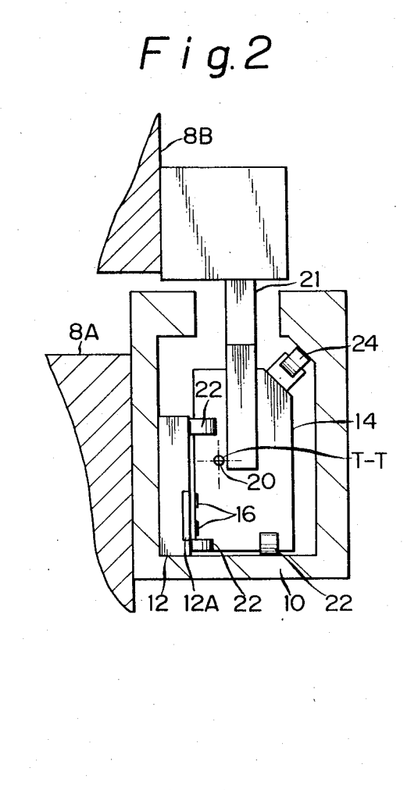
FIG. 2 is a cross-sectional view showing the arrangement of a first embodiment of the linear scale type displacement measuring instrument according to the present invention.
Figure 3:
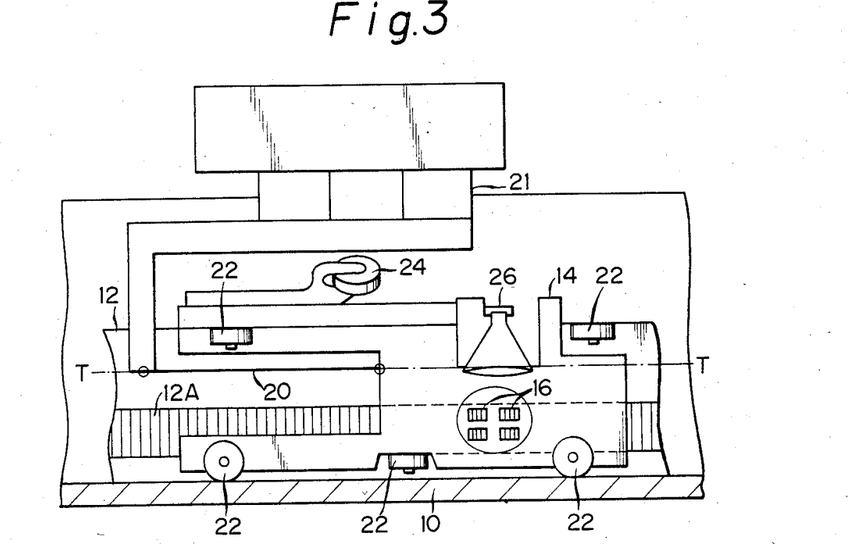
FIG. 3 is a longitudinal sectional view showing the essential portions thereof.
Figure 4:
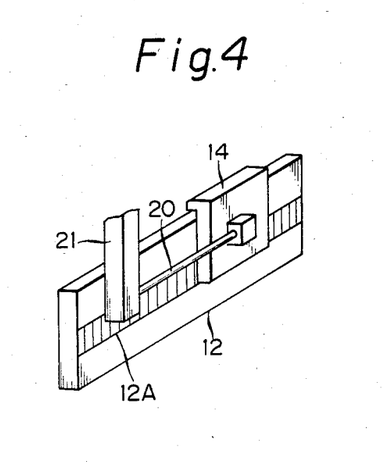
FIG. 4 is a perspective view showing the connecting mechanism thereof.
Figure 5:
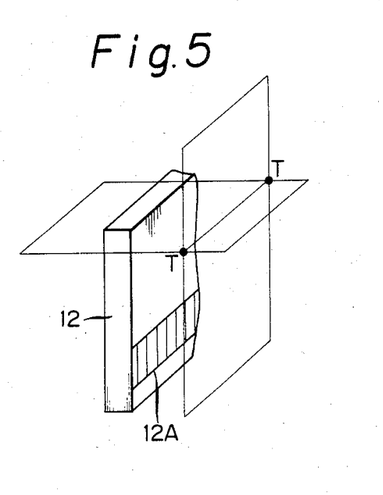
FIG. 5 is a perspective view showing the relationship between the lines crossing one another of the neutral planes of the main scale and the case thereof.

Referring to the drawing, designated at 22 are rollers for guiding the movement of the carriage 14 in the case 10, 24 is a roller incorporating a spring, not shown, for biasing the carriage 14 such that the carriage 14 can be engaged with the main scale 12 constantly at a predetermined clearance, and 26 a light source.

The main scale 12 and the index scales 16 are each formed of a transparent material such for example as glass, in which light transmitting portions and light non-transmitting portions are alternately formed at regular intervals.

The reason why the graduation fringes of four types are formed on the index scales 16 is that the graduation fringes are changed in phases therebetween to thereby judge a direction of movement and divide a displacement signal obtained by the detector.

Figure 6:
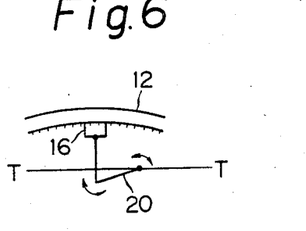
FIG. 6 is a plan view showing the state of permitting the carriage to change the posture in the connecting mechanism thereof.
Figure 7:
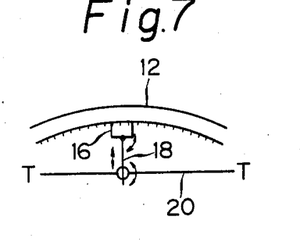
FIG. 7 is a plan view showing a modification of the state of permitting the carriage to change the posture thereof.

As shown in FIG. 6 for example, the rod 20 is made rotatable at opposite ends thereof, and the carriage 14 is permitted to change the posture thereof such that the index scales 16 can be held in states of constantly, perpendicularly intersecting the normal line of the surface of a warp of the main scale 12. Additionally, the arrangement of permitting the carriage 14 to change the posture thereof need not necessarily be limited to this, and such an arrangement may be adopted that, for example, as shown in FIG. 7, a joint portion between the rod 20 and the carriage 14 and holding portion of the index scales 16 in the carriage 14 are made rotatable, and an arm 18 connecting the index scales 16 to the rod 20 is made slidable in the axial direction of the arm 18 at a joint portion with the rod 20.

In this first embodiment, the cross line T—T between the two neutral planes of the main scale 12 is present in the space of the case 10, so that only the use of the single rod 20 makes it possible to materialize the present invention very easily.

Detailed description will hereunder be given of the second embodiment of the present invention.

Figure 8:
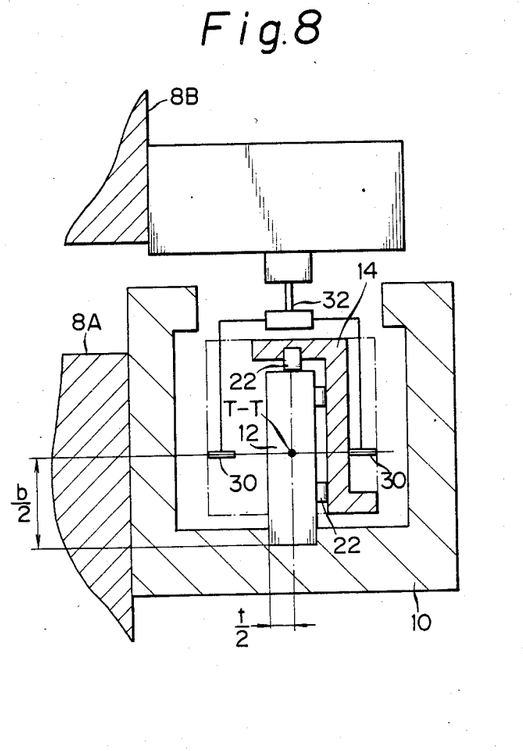
FIG. 8 is a cross-sectional view showing the arrangement of a second embodiment of the linear scale type displacement measuring instrument according to the present invention.
Figure 9:
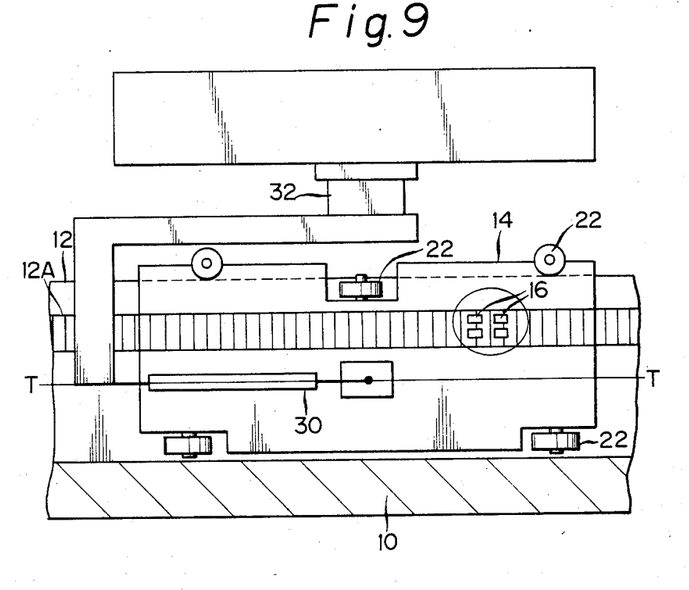
FIG. 9 is a longitudinal sectional view of the essential portions thereof.
Figure 10:
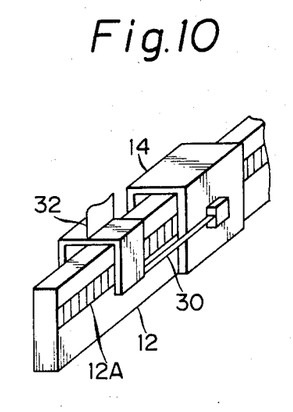
FIG. 10 is a perspective view showing the connecting mechanism thereof.

As shown in FIGS. 8 to 10, according to this second embodiment, the present invention is applied to a light transmitting type optical linear scale type displacement measuring instrument comprising: a case 10; a light transmitting type main scale 12; a carriage 14, index scales 16 and a detector, not shown, all of which are similar to those in the first embodiment; wherein a cross line between neutral planes of the main scale 12 itself is made to meet the cross line in the case of the main scale 12 being mounted to the case 10, the carriage 14 and the other 8B of the relatively movable members are connected to each other through two sets of flat springs 30 and a spring 32 which constitute a connecting mechanism, one end of which is connected to the carriage 14, the other end of which is connected to the other 8B of the relatively movable members within two neutral planes perpendicularly intersecting each other of the case 10 as a whole including the main scale 12, and capable of permitting the carriage 14 to change the posture thereof such that the index scales 16 can be held in states of perpendicularly intersecting the normal line of the surface of a warp of the main scale 12.

The respects other than the above are similar to the first embodiment, so that detailed description thereof need not be repeated.

The aforesaid flat springs 30 and spring 32 are incorporated in a plane located at ½ of the height b of the main scale 12 and in a plane located at ½ of the thickness t of the main scale 12, respectively.

This embodiment has such characteristic features that one part of the connecting mechanism is made to additionally function as a connecting arm, the structure is relatively simplified, and an adverse influence of the method of fixing the main scale 12 to the case 10 is not easily exerted.

Detailed description will now be given of the third embodiment of the present invention.

Figure 11:
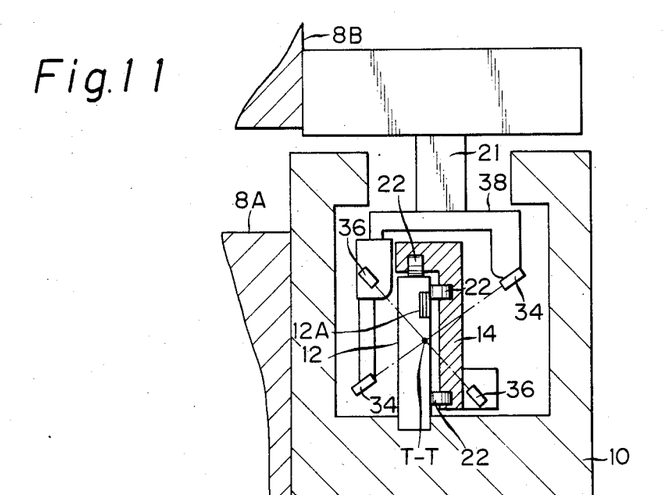
FIG. 11 is a cross-sectional view showing the arrangement of a third embodiment of the linear scale type displacement measuring instrument according to the present invention.
Figure 12:
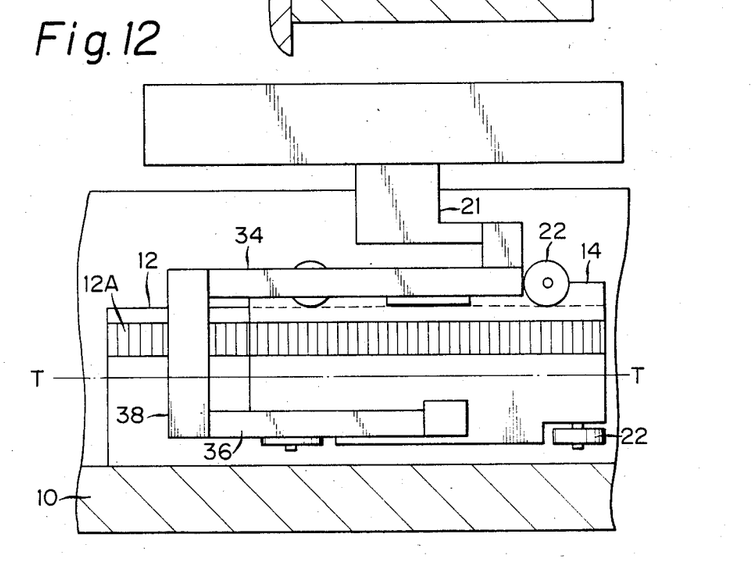
FIG. 12 is a longitudinal sectional view of the essential portions thereof.
Figure 13:
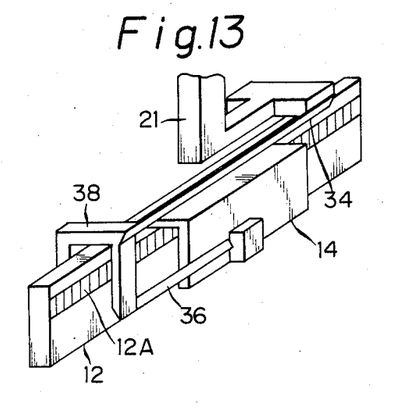
FIG. 13 is a perspective view showing the connecting mechanism thereof.

As shown in FIGS. 11 to 13, according to this third embodiment, the present invention is applied to a light transmitting type optical linear scale type displacement measuring instrument including: a case 10; a main scale 12, a carriage 14, index scales 16 and a detector, not shown, all of which are similar to those in the second embodiment; wherein a cross line between neutral planes of the case 10, to which the main scale 12 is mounted, is present in the main scale 12, the carriage 14 and the other 8B of the relatively movable members are connected to each other through two sets of flat springs 34, 36 and a connecting bracket 38 for linking the flat springs 34 and 36 to each other, which constitute a connecting mechanism, one end of which is connected to the carriage 14, the other end of which is connected to the other 8B of the relatively movable members in each of two neutral planes perpendicularly intersecting each other of the case 10 as a whole including the main scale 12, and capable of permitting the carriage 14 to change the posture thereof such that the index scales 16 can be held in states of perpendicularly intersecting the normal line of the surface of a warp of the main scale 12.

The respects other than the above are similar to the preceding embodiments, so that detailed description thereof need not be repeated.

In this third embodiment, the connecting bracket 38 is interposed between the carriage 14 and the connecting arm 21, so that a change in posture of the carriage 14 can be performed more smoothly.

In this third embodiment, whereever the neutral planes of the case as a whole including the main scale 12 may be located, the present invention can be materialized easily.

Additionally, in the preceding embodiments, the carriage 14 has been guided by only the main scale 12 itself or by both the main scale 12 and the case 10, however, the object, to which the present invention is applied, need not necessarily be limited to this, and the present invention is applicable to one, in which the carriage 14 is guided only by the case 10 for example.

What is claimed is:

1. A linear scale type displacement measuring instrument comprising: a hollow elongate case extending in a direction of linear movement of relatively movable members and fixed to one of the relatively movable members, said case having a neutral plane including the longitudinal axis of the case; a main scale secured to the inner surface of the case in the longitudinal direction thereof and offset from the longitudinal axis of said case; a carriage connected to the other of the relatively movable members and movable along said main scale in the longitudinal direction thereof; a connecting mechanism connecting said carriage to the other of the relatively movable members; index scale held by the carriage and opposed to the main scale; and a detector for converting a displacement value of relative movement between said main scale and said index scale into an electric signal;

one end of said connecting mechanism being connected to said carriage and the other end of said connecting mechanism being connected to the other of the relative movable members within neutral planes of the case as a whole including said main scale mounted therein, and said connecting mechanism being capable of permitting said carriage to change the posture thereof such that said index scales can be held in states of perpendicularly intersecting the normal line of the surface of a warp of said main scale.

2. A displacement measuring instrument as set forth in claim 1, wherein said carriage is guided by said main scale itself.

3. A displacement measuring instrument as set forth in claim 1, wherein said carriage is guided by both said main scale and said case.

4. A displacement measuring instrument as set forth in claim 1, wherein said carriage is guided only by said case.

5. A displacement measuring instrument as set forth in claim 1, wherein connections through said connecting mechanism are made on a cross line between a plurality of neutral planes crossing each other of said case as a whole including said main scale mounted therein.

6. A displacement measuring instrument as set forth in claim 5, wherein said connecting mechanism comprises a single rod.

7. A displacement measuring instrument as set forth in claim 6, wherein said rod is rotatable at opposite ends thereof.

8. A displacement measuring instrument as set forth in claim 6, wherein a joint portion between said rod and said carriage and a holding portion of said index scales in said carriage are rotatable, and an arm connecting said index scales to said rod is slidable in the axial direction of said arm at a joint portion with said rod.

9. A displacement measuring instrument as set forth in claim 1, wherein connections through said connecting mechanism is made in each of neutral planes crossing each other of said case as a whole including said main scale mounted therein.

10. A displacement measuring instrument as set forth in claim 9, wherein said connecting mechanism comprises two sets of flat springs.

11. A displacement measuring instrument as set forth in claim 10, wherein said flat springs are incorporated in a plane located at ½ of the height of said main scale and in a plane located at ½ of the thickness of said main scale, respectively.

12. A displacement measuring instrument as set forth in claim 9, wherein said connecting mechanism comprises two sets of flat springs and a connecting bracket for linking said flat springs to each other.

* * * * *